United States Patent [19]

Webb

[11] Patent Number: 5,087,356

[45] Date of Patent: Feb. 11, 1992

[54] SOLDER DROSS REMOVAL APPARATUS

[75] Inventor: Winston S. Webb, Duaedin, Fla.

[73] Assignee: The United States of America as represented by the Administrator of the National Aeronautics and Space Administration, Washington, D.C.

[21] Appl. No.: 524,110

[22] Filed: May 16, 1990

[51] Int. Cl.⁵ .......................... B01D 21/30; B23K 1/00
[52] U.S. Cl. ..................................... 210/143; 210/523; 210/525; 210/528; 266/78; 266/92; 266/228; 228/34; 228/56.2; 15/250.17
[58] Field of Search ............... 210/143, 523, 525, 528, 210/531, 923; 266/78, 228, 92; 15/250.17; 228/56.2, 34; 318/444

[56] References Cited

U.S. PATENT DOCUMENTS

| 3,941,360 | 3/1976 | Blank | 266/228 |
|---|---|---|---|
| 3,980,219 | 9/1976 | Schmid | 228/34 |
| 4,007,119 | 2/1977 | Antonevich | 210/523 |
| 4,332,373 | 6/1982 | Huppunen et al. | 266/228 |
| 4,509,670 | 4/1985 | Cammarata | 228/56.2 |
| 4,705,998 | 1/1987 | Millerd et al. | 15/250.17 |

Primary Examiner—Robert A. Dawson
Assistant Examiner—David Reifsnyder
Attorney, Agent, or Firm—Robert L. Broad, Jr.; Jerry L. Seemann

[57] ABSTRACT

An automatic dross removal apparatus (10) is disclosed for removing dross from the surface of a solder bath (22) in an automated electric component handling system. A rotatable wiper blade (14) is positioned adjacent the solder bath (22) which skims the dross off of the surface prior to the dipping of a robot conveyed component into the bath. An electronic control circuit (34) causes a motor (32) to rotate the wiper arm (14) one full rotational cycle each time a pulse is received from a robot controller (44) as a component approaches the solder bath (22).

6 Claims, 2 Drawing Sheets

SOLDER DROSS REMOVAL APPARATUS

ORIGIN OF THE INVENTION

The invention described herein was made in the performance of work under a NASA contract and is subject to the provisions of Section 305 of the National Aeronautics and Space Act of 1958, as amended, (42 USC 2457).

1. Technical Field

The present invention relates in general to a solder dross removal apparatus for removing dross and burnt flux from a static solder pot in an automated electronic component preparation system.

2. Background Art

In automated electronic component preparation systems, the components are typically assembled to printed wiring boards or modules after having their leads tinned in a molten solder bath. Wave soldering machines have been used for this purpose and employ a solder bath that is agitated so that the solder rises in waves against the component leads as the components are conveyed above the bath. A difficulty with these types of soldering machines is that the waves are unsteady and hard to control which makes positioning of the components relative to the soldering machine difficult. The use of a static solder pot remedies this problem, however, a top layer of dross and burnt flux which adversely affects the quality of the solder process quickly builds up if the solder is not agitated.

DISCLOSURE OF INVENTION

It is therefore the object of the present invention to provide an apparatus for removing dross from a static solder pot in an automated electronic component preparation system. This and other objects of the invention are achieved through provision of an automatic dross removing apparatus which includes a rotatable wiper blade that skims across the top surface of a solder bath in a pot and moves the dross to one side so that a clean solder surface is provided each time a component is dipped into the bath by a robot arm. The wiper is rotated by a motor that is intermittently driven in response to control signals from a robot controller so that the wiper sweeps the dross just before the robot arm dips a component into the solder bath. In this manner, the cleanest possible solder surface will be provided for each component before it is dipped into the solder bath.

BRIEF DESCRIPTION OF DRAWINGS

The foregoing and additional objects, features and advantages of the present invention will become apparent from the following detailed description thereof, taken in conjunction with the accompanying drawings in which.

BEST MODE FOR CARRYING OUT THE INVENTION

Figure 1:
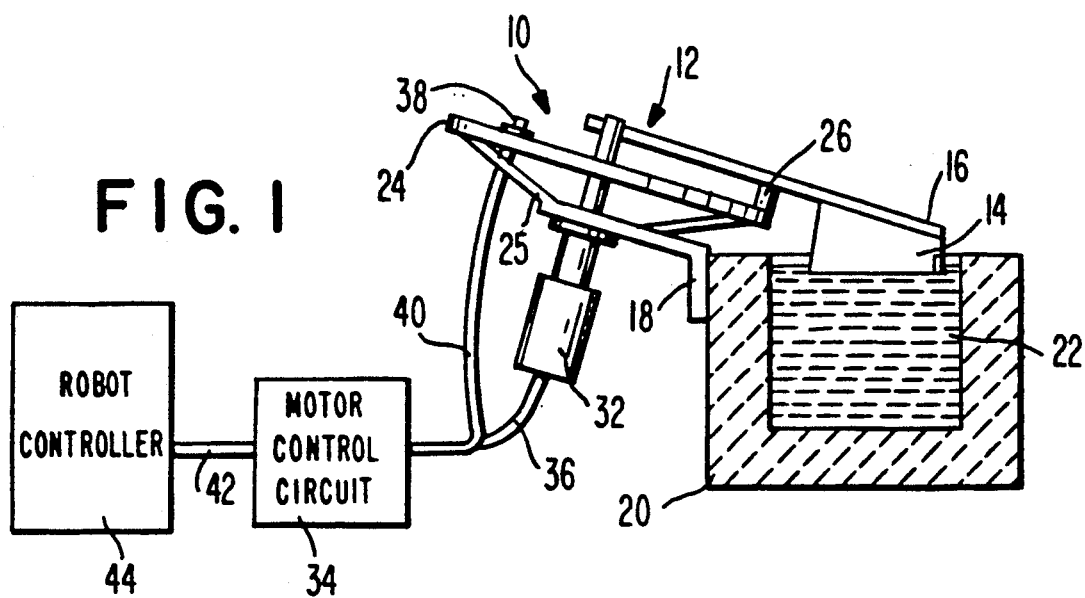
FIG. 1 is a side view of a preferred embodiment of the present invention, showing a solder pot in cross section.
Figure 2:
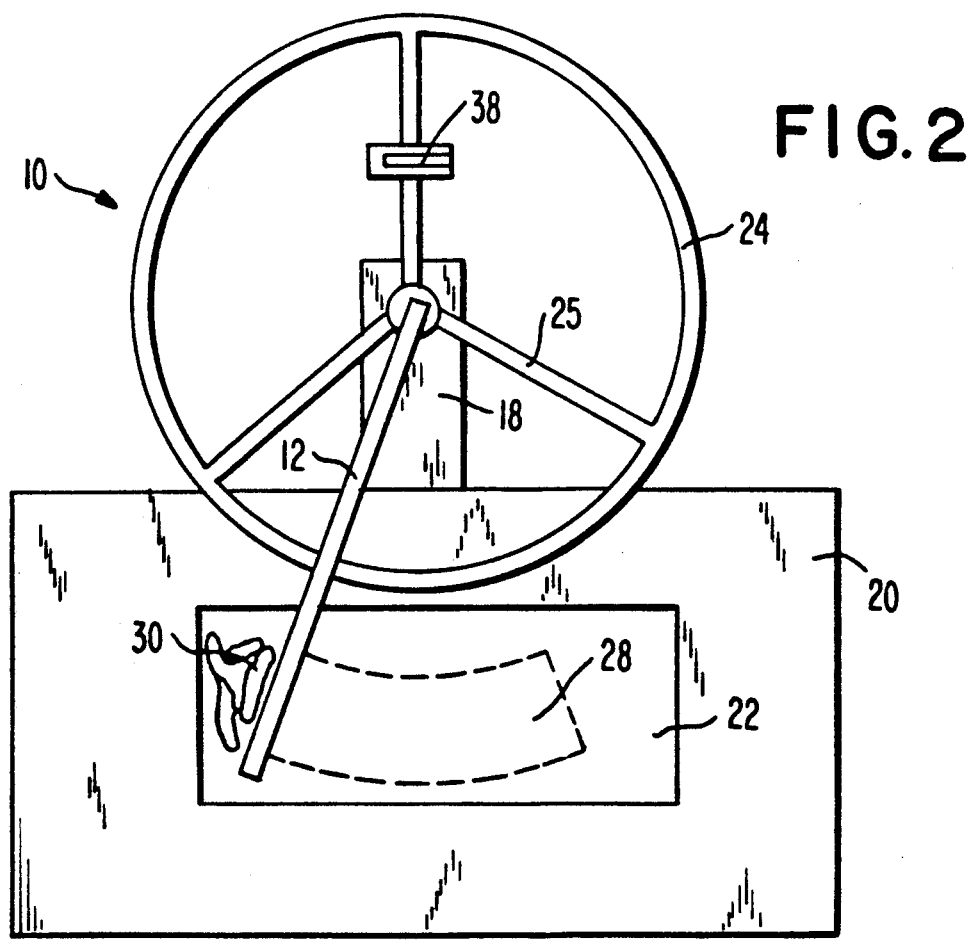
FIG. 2 is a top view of a preferred embodiment of the present invention.

Turning now to a more detailed consideration of the present invention, a solder dross removal apparatus is illustrated in FIG. 1 generally at 10 which includes a rotatable shaft and arm assembly 12 having a wiper blade 14 attached to a free end 16 thereof. The apparatus 10 is attached by means of a support bracket 18 to the side of an electric solder heater pot 20 which contains a molten solder bath 22 for use in tinning the leads of electrical components. A circular cam wheel 24 is attached to the support bracket 18 by means of a plurality of support arms 25 which guides the arm 12 as it rotates on a teflon slide bearing 26. As illustrated in FIG. 1, the cam wheel 24 is disposed at an inclined angle relative to the surface of the solder bath 22 so that as the arm 12 rotates, the wiper blade 14 will be dipped into the solder bath 22 and then raised above the bath so that it will clear the edge of the pot 20. This action causes the wiper blade 14 to skim the top surface of the solder bath 22 and form a clean area of solder 28 as illustrated by the dash lines in FIG. 2. The dross and burnt flux that is removed from the clean area 28 is moved to one side of the solder pot 20 as illustrated generally at 30. Preferably, the arm assembly is positioned so that the wiper blade 14 skims the top approximately 0.150 microns of the solder bath 22.

To control the intermittent rotation of the shaft and arm assembly 12, an electric gear motor 32 of conventional design is attached thereto which is operated by signals from a motor control circuit 34 that is electrically connected to the motor 32 via a line 36. The motor 32 rotates the shaft and arm assembly 12 so that the wiper blade 14 travels at a suitable speed, such as approximately 3.5 inches per second. A mechanically actuated electrical switch 38 is attached to the cam wheel assembly 24 in such a position that the arm assembly 12 will contact it and cause switch 38 to close as the arm contacts switch 38. The switch 38 is electrically connected via a line 40 to the motor control circuit 34, which in turn is connected via a line 42 to a robot controller 44.

Figure 3:
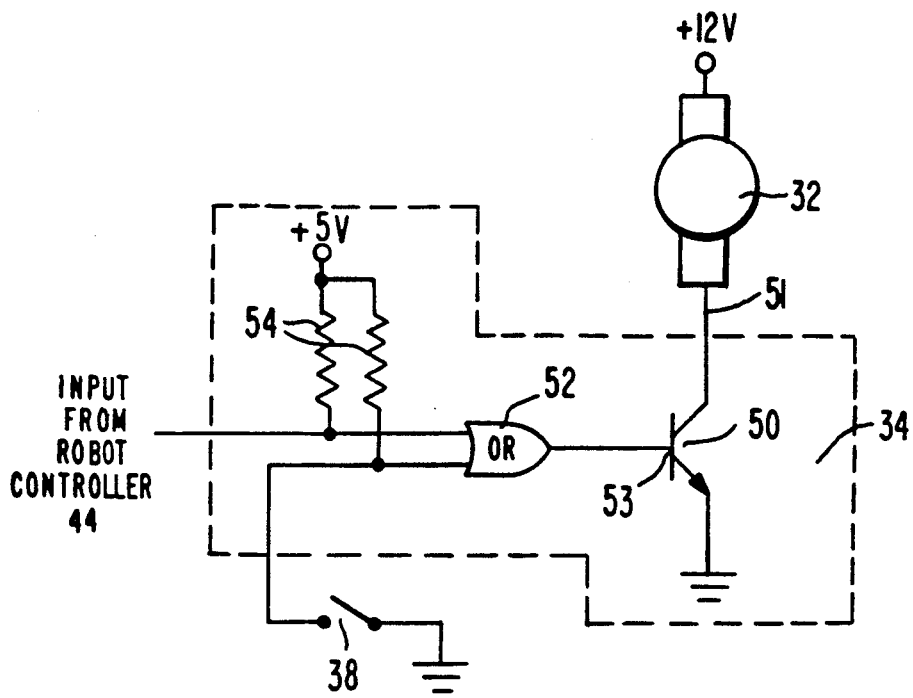
FIG. 3 is a schematic circuit diagram of a motor control circuit for a preferred embodiment of the present invention; and, FIG. 4 is a timing diagram for the circuit of FIG. 3.

The schematic for the motor control circuit 34 is illustrated in FIG. 3 and essentially comprises a transistor switch 50 that is placed in a ground line 51 for the motor 32 and is controlled by the output of an OR gate 52 connected to a base 53 of the transistor switch 50. The OR gate 52 has two inputs, a first input from the robot controller 44 which generates a pulse in response to the approach of a component to be dipped in the solder bath 22 on a robot arm, and a second input from ground through the switch 38. A five volt DC source is connected through a pair of pull-up resistors 54 to the inputs of the OR gate 52. In this manner, whenever either the switch 38 is open circuited or a pulse is generated by the robot controller 44, the output of the OR gate 52 will be high so that the transistor switch 50 will complete the circuit to the motor 32 and the motor 32 will be actuated to thereby rotate the shaft and arm assembly 12.

Figure 4:
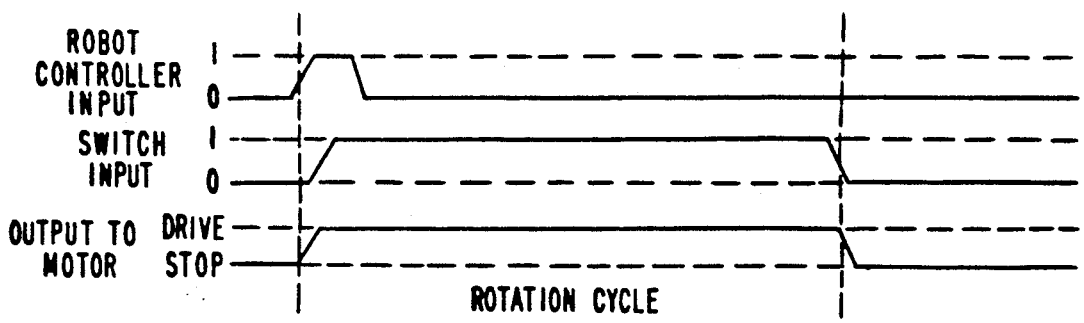

The timing diagram for the motor control circuit 34 is illustrated in FIG. 4. As the robot arm approaches the solder bath with a component to be dipped therein, a short pulse of approximately 100 milliseconds appears on the input from the robot controller 44 and the OR gate 52 generates a high output so that the motor 32 is actuated and rotates the arm assembly 12. As this happens, the switch 38 will open so that the output of the OR gate 52 will remain high and the arm assembly 12 will continue to rotate through one full rotation cycle until the arm closes the switch 38 once again and the motor 32 stops. This cycle repeats each time a pulse is sent by the robot controller 44 to the OR gate 52.

In the above manner, the present invention provides an apparatus for sweeping dross off the surface of a molten solder bath that is automatically operated in response to a trigger pulse each time a component to be dipped into the solder bath approaches the bath on a robot arm. The invention thereby enables the use of a static solder pot which ensures accurate positioning of the solder bath relative to the components to be dipped therein and eliminates dross build up problems that are normally associated with such static solder pots.

Although the invention has been disclosed in terms of a preferred embodiment, it should be understood that numerous modifications and variations could be made thereto without departing from the true spirit and scope thereof as defined by the following claims.

I claim:

1. Apparatus for removal of dross from a top surface of a bath comprising:
   a) a pot containing a bath;
   b) a rotatable wiper means positioned adjacent said pot so that said wiper means will skim the surface of said bath as the wiper means rotates;
   c) motor means attached to said rotatable wiper means to rotate the same;
   d) switch means disposed adjacent said rotatable wiper means and operable by said rotatable wiper means to disconnect power to said motor means once every revolution of said wiper means; and
   e) means to override said switch means and supply power to said motor means in response to an element approaching said pot to be dipped therein.

2. The apparatus of claim 1 wherein said means to override further comprises:
   a transistor switch disposed in a ground line for said motor means; and,
   an OR gate having an output connected to a base of said transistor switch, a first input connected to an output of said switch means disposed adjacent said rotatable wiper means, and a second input connected to a means for generating a pulse in response to an element approaching said pot to be dipped therein.

3. The apparatus of claim 2 wherein said bath is a said solder bath and said means to override operates in response to an electronic component approaching said pot to be dipped therein by an automated component handling system.

4. An apparatus for removal of dross from a top surface of a solder bath comprising:
   a) a pot containing a solder bath;
   b) a rotatable wiper means positioned adjacent said pot to skim the surface of said bath as the wiper means rotates;
   c) motor means attached to said rotatable wiper means to rotate the same; and,
   d) a motor control circuit for said motor means including;
      i) means to actuate said motor means in response to a signal pulse received from a robot controller indicating that an electrical component to be dipped in said solder bath is approaching said solder bath; and
      ii) means to deactuate said motor means automatically after said rotatable wiper means has skimmed the surface of said bath once.

5. The apparatus of claim 4 wherein said means to deactuate said motor means comprises:
   switch means disposed adjacent said rotatable wiper means and operable by said rotatable wiper means to disconnect power to said motor means once every revolution of said wiper means.

6. The apparatus of claim 5 wherein said means to actuate said motor means comprises:
   a transistor switch disposed in a power line for said motor means; and,
   an OR gate having an output connected to a base of said transistor switch, a first input connected to an output of said switch means disposed adjacent said rotatable wiper means, and a second input connected to said robot controller for receiving a signal pulse in response to an electronic component approaching said solder bath to be dipped therein.

* * * * *